(12) United States Patent
Natanzon et al.

(10) Patent No.: US 10,908,999 B2
(45) Date of Patent: Feb. 2, 2021

(54) NETWORK BLOCK DEVICE BASED CONTINUOUS REPLICATION FOR KUBERNETES CONTAINER MANAGEMENT SYSTEMS

(71) Applicant: EMC IP Holding Company LLC, Hopkinton, MA (US)

(72) Inventors: Assaf Natanzon, Tel Aviv (IL); Ran Goldschmidt, Herzelia (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 255 days.

(21) Appl. No.: 16/049,564

(22) Filed: Jul. 30, 2018

(65) Prior Publication Data

US 2020/0034240 A1    Jan. 30, 2020

(51) Int. Cl.
  *G06F 11/14*    (2006.01)
  *G06F 9/455*    (2018.01)
  *G06F 16/182*    (2019.01)

(52) U.S. Cl.
  CPC ...... *G06F 11/1448* (2013.01); *G06F 9/45558* (2013.01); *G06F 16/184* (2019.01); *G06F 2009/45583* (2013.01)

(58) Field of Classification Search
  None
  See application file for complete search history.

(56) References Cited

U.S. PATENT DOCUMENTS

| | | | |
|---|---|---|---|
| 8,332,613 B1 * | 12/2012 | Glade ................... | G06F 3/0617 711/152 |
| 9,652,341 B1 * | 5/2017 | Lewis .................. | G06F 11/2005 |
| 2012/0134355 A1 * | 5/2012 | Vendrow ................ | H04Q 3/005 370/389 |
| 2016/0239396 A1 * | 8/2016 | Deng ................... | G06F 11/1666 |
| 2018/0307537 A1 * | 10/2018 | Chen ..................... | G06F 16/128 |
| 2018/0375936 A1 * | 12/2018 | Chirammal ......... | H04L 67/1097 |
| 2019/0324786 A1 * | 10/2019 | Ranjan .................. | G06F 9/4856 |
| 2020/0019388 A1 * | 1/2020 | Jaeger ..................... | G06F 8/427 |
| 2020/0028894 A1 * | 1/2020 | Memon ................... | H04L 67/10 |

* cited by examiner

*Primary Examiner* — Uyen T Le
(74) *Attorney, Agent, or Firm* — Staniford Tomita LLP

(57) ABSTRACT

Providing continuous replication for container management system that allows configuration of a volume as a replicated network block device (NBD) volume to an actual backend volume. The system configures a pod with an NBD container running and with the actual backend volume device attached. An NBD server intercepts all I/O data arriving to the NBD volume and a filter driver intercepts writes to the NBD volume and writes them to the actual backend volume. The intercepted I/O data is also sent to a remote replication server container with persistent and journal volumes. The data is applied to the replication volume using the journal as a recover point for recovery for any point in time.

20 Claims, 7 Drawing Sheets

NETWORK BLOCK DEVICE BASED CONTINUOUS REPLICATION FOR KUBERNETES CONTAINER MANAGEMENT SYSTEMS

CROSS-REFERENCE TO RELATED APPLICATIONS

The present application is related to U.S. patent application Ser. No. 16/049,493 entitled "Seamless Mobility for Kubernetes Based Stateful Pods using Moving Target Defense" and filed on Jul. 30, 2018.

TECHNICAL FIELD

Embodiments are generally directed to network backup systems, and more specifically to performing application level backups in Kubernetes container management systems.

BACKGROUND

Containerization technology has been developed as a lightweight alternative to full machine virtualization that involves encapsulating an application in a container with its own operating environment. This provides many of the benefits of loading an application onto a virtual machine (VM), as the application can be run on any suitable physical machine without any concern about dependencies. Containerization has gained recent prominence with the open-source Docker, in which containers are deployed as portable, self-sufficient containers that can run on everything from physical computers to VMs, bare-metal servers, cloud clusters, and so on. Application containerization is an operating system level virtualization method for deploying and running distributed applications without launching an entire VM for each application. Instead, multiple isolated systems are run on a single control host and access a single kernel. The application containers hold the components such as files, environment variables and libraries necessary to run the desired software. Because resources are shared in this way, application containers can be created that place less strain on the overall resources available.

The Kubernetes system (developed by Google) is becoming a popular container management platform for managing containerized applications in a clustered environment. It aims to provide better ways of managing related, distributed components across varied infrastructures. New backup mechanisms like Heptio Ark, and similar systems, allow data backups to a Kubernetes environment. However, one problem is that such backup mechanisms allow only system level backups and not application level backups. Furthermore, there is no integrated replication system for Kubernetes. Also, continuous replication for Kubernetes is a complex undertaking. It is possible to replicate volumes using kernel filter drivers, or leverage a splitter in a storage array, but both such replication techniques are limited. The array based replication technique requires specific array and is not heterogeneous, and the kernel splitter depends on the OS and requires access to the kernel.

What is needed, therefore, is a method of providing continuous replication for Kubernetes container management systems.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. ScaleIO and RecoverPoint are trademarks of DellEMC Inc.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
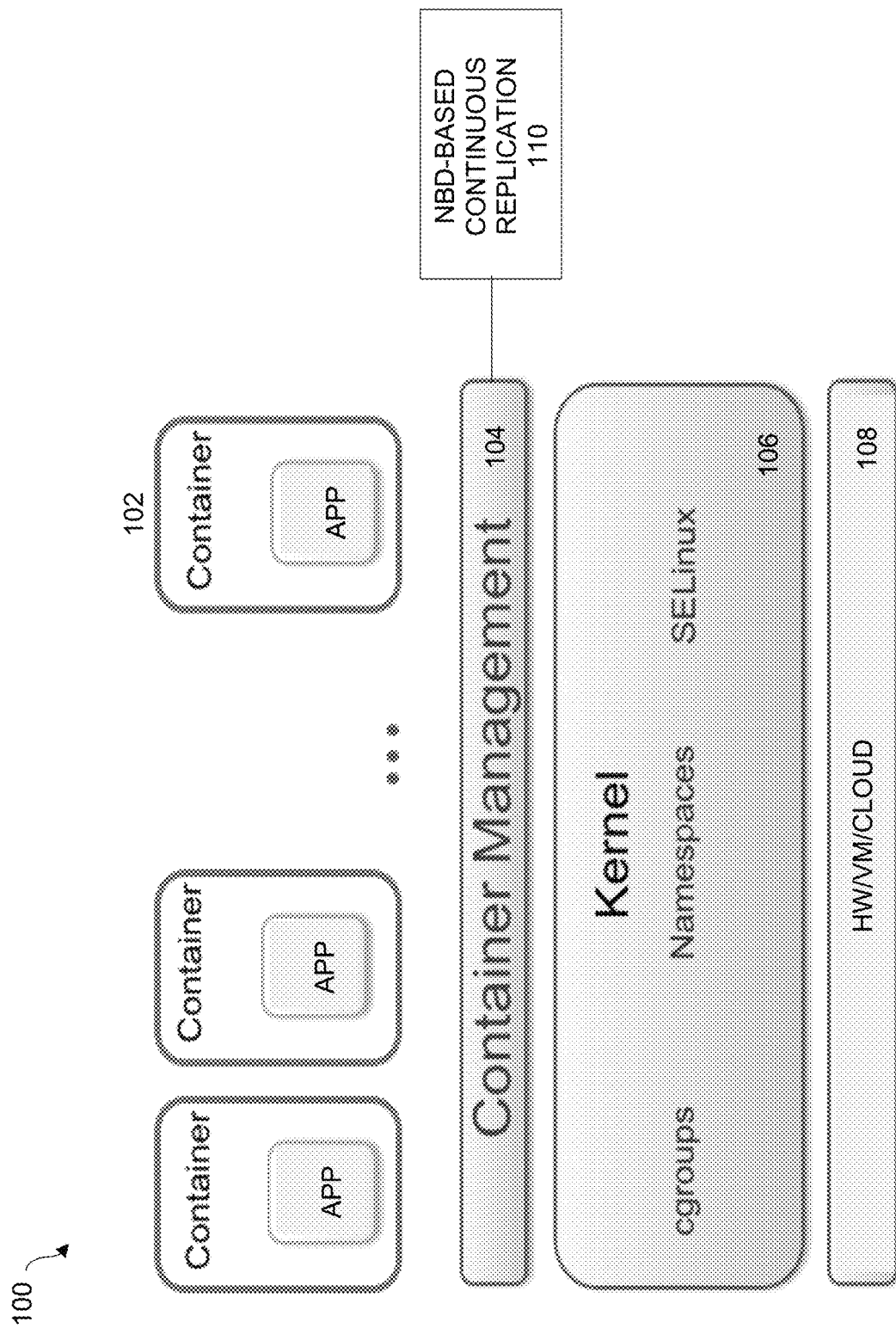
FIG. 1 is a diagram of a container management system implementing NBD based continuous replication, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. In this specification, implementations, or any other form that the invention may take, may be referred to as techniques. In general, the order of the steps of disclosed processes may be altered within the scope of the invention.

Some embodiments of the invention certain computer network techniques deployment in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are directed to a network block device (NBD) based continuous replication method and system for container management systems. In an embodiment, the container management system comprises a Kubernetes system, though all embodiments are not so limited. Other container management systems similar to Kubernetes may also be used, and specific reference to Kubernetes is meant to be primarily for example or illustration.

FIG. 1 illustrates a container management system that includes or executes an NBD-based continuous replication method, under some embodiments. As shown in FIG. 1, system 100, a number of applications (apps) are encapsulated in respective containers 102 so that each application operates within its own operating environment. The containers are deployed as portable, self-sufficient data structures that can run any practical hardware platform 108 from VMs, cloud clusters, servers, and so on. The multiple isolated containers are run on a single control host and access a single kernel 106 that provides access to certain Linux kernel features such as cgroups (control groups), namespaces, security enhancements (e.g., SELinux), and so on. In an embodiment, system 100 utilizes the Docker container format to abstract the lower layer of container technology, though other similar formats may also be used. An application can run in multiple containers, and usually a container will just run a single micro service.

The container management layer 104 is used to automate the creation, destruction, deployment and scaling of the containers 102. It includes a container orchestration process or component that arranges, coordinates and manages the containers. As the number and scale of the containers increases, certain orchestration tasks are required, such as service discovery, load balancing configuration, health checks, auto-scaling, zero-downtime deploys, and so on. Replication of container data is also key for critical enterprise tasks such as disaster recovery and data restoration. For the embodiment of FIG. 1, an NBD-based replication process 110 is used in conjunction with the container management layer 104, as described in greater detail later in this description.

Kubernetes Container Management Platform

In an embodiment, the container management layer is implemented as a Kubernetes platform, which is an open-source platform for automating deployments, scaling, and operations of application containers across clusters of hosts, providing container-centric infrastructure. In a Kubernetes system, a cluster consists of at least one cluster master and multiple worker machines called nodes. A cluster is the foundation the system and the Kubernetes objects that represent the containerized applications all run on top of a cluster.

Figure 2:
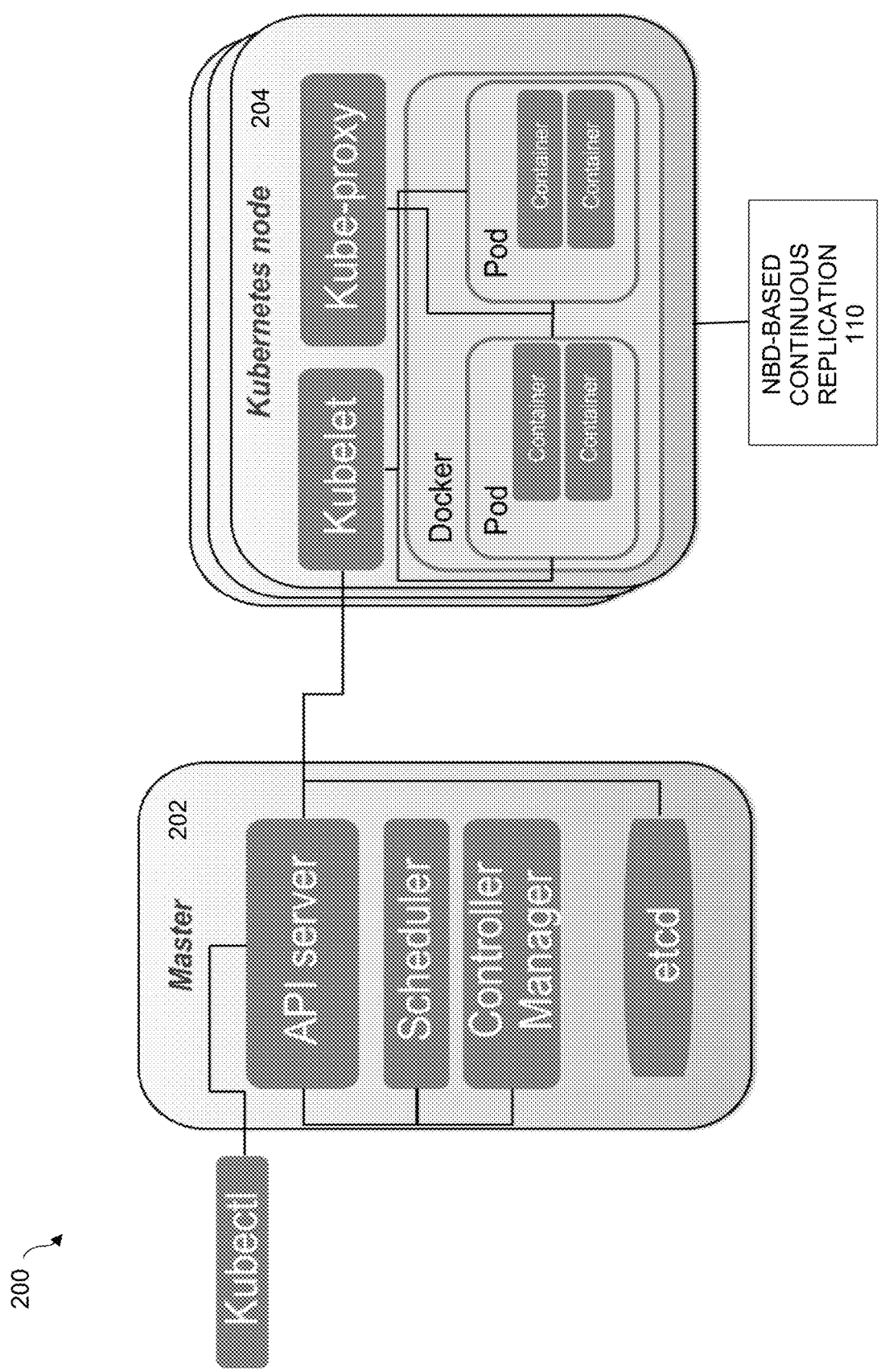
FIG. 2 is a block diagram that illustrates the architecture of a Kubernetes platform implementing a continuous replication process, under some embodiments.

FIG. 2 is a block diagram 200 that illustrates the architecture of a Kubernetes platform implementing a continuous replication process, under some embodiments. The controlling services in a Kubernetes cluster are called the master 202, or control plane, components. These operate as the main management contact points for administrators, and also provide many cluster-wide systems for the relatively dumb worker nodes. These services can be installed on a single machine, or distributed across multiple machines. The servers running these components have a number of unique services that are used to manage the cluster's workload and direct communications across the system.

One of the fundamental components that Kubernetes needs to function is a globally available configuration store. The etcd project, developed by the CoreOS team, is a lightweight, distributed key-value store that can be distributed across multiple nodes. Kubernetes uses etcd to store configuration data that can be used by each of the nodes in the cluster. This can be used for service discovery and represents the state of the cluster that each component can reference to configure or reconfigure themselves. By providing a simple HTTP/JSON API, the interface for setting or retrieving values is very straight forward. Like most other components in the control plane, etcd can be configured on a single master server or, in production scenarios, distributed among a number of machines. The only requirement is that it be network accessible to each of the Kubernetes machines.

One of the most important master services is an API server. This is the main management point of the entire cluster, as it allows a user to configure many of Kubernetes' workloads and organizational units. It also is responsible for making sure that the etcd store and the service details of deployed containers are in agreement. It acts as the bridge between various components to maintain cluster health and disseminate information and commands. The API server implements a RESTful interface, which means that many different tools and libraries can readily communicate with it. A client called kubecfg is packaged along with the server-side tools and can be used from a local computer to interact with the Kubernetes cluster.

The controller manager service is a general service that has many responsibilities. It is responsible for a number of controllers that regulate the state of the cluster and perform routine tasks. For instance, the replication controller ensures that the number of replicas defined for a service matches the number currently deployed on the cluster. The details of these operations are written to etcd, where the controller manager watches for changes through the API server. When a change is seen, the controller reads the new information and implements the procedure that fulfills the desired state. This can involve scaling an application up or down, adjusting endpoints, etc.

The process that actually assigns workloads to specific nodes in the cluster is the scheduler. This is used to read in a service's operating requirements, analyze the current infrastructure environment, and place the work on an acceptable node or nodes. The scheduler is responsible for tracking resource utilization on each host to make sure that workloads are not scheduled in excess of the available resources. The scheduler must know the total resources available on each server, as well as the resources allocated to existing workloads assigned on each server.

In Kubernetes, servers that perform work are known as nodes 204. Node servers have a few requirements that are necessary to communicate with the master components, configure the networking for containers, and run the actual workloads assigned to them. The first requirement of each individual node server is docker. The docker service is used to run encapsulated application containers in a relatively isolated but lightweight operating environment. Each unit of work is, at its basic level, implemented as a series containers that must be deployed. One key assumption that Kubernetes makes is that a dedicated subnet is available to each node server. This is not the case with many standard clustered deployments. For instance, with CoreOS, a separate networking fabric called flannel is needed for this purpose. Docker must be configured to use this so that it can expose ports in the correct fashion. In an embodiment, the continuous replication process is executed in each node or at least some nodes 204 of the system 200.

The main contact point for each node with the cluster group is through a small service called kubelet. This service is responsible for relaying information to and from the control plane services, as well as interacting with the etcd store to read configuration details or write new values. The kubelet service communicates with the master components to receive commands and work. Work is received in the form of a "manifest" which defines the workload and the operating parameters. The kubelet process then assumes responsibility for maintaining the state of the work on the node server.

In order to deal with individual host subnetting and in order to make services available to external parties, a small proxy service is run on each node server. This process forwards requests to the correct containers, can do primitive load balancing, and is generally responsible for making sure the networking environment is predictable and accessible, but isolated.

While containers are the used to deploy applications, the workloads that define each type of work are specific to Kubernetes. Different types of "work" can be assigned, as described below. A pod is the basic unit that Kubernetes deals with. Containers themselves are not assigned to hosts. Instead, closely related containers are grouped together in a pod. A pod generally represents one or more containers that should be controlled as a single "application." This association leads all of the involved containers to be scheduled on the same host. They are managed as a unit and they share an environment. This means that they can share volumes and IP space, and can be deployed and scaled as a single application. Pods can be thought of as a single virtual computer in order to best conceptualize how the resources and scheduling should work. The general design of pods usually consists of the main container that satisfies the general purpose of the pod, and optionally some helper containers that facilitate related tasks. These are programs that benefit from being run and managed in their own container, but are heavily tied to the main application. Horizontal scaling is generally discouraged on the pod level because there are other units more suited for the task.

A pod is thus the basic building block of Kubernetes and comprises one or more containers and share storage resources, and network resources. Pods run in a shared context, share the same IP using different port for containers. Containers within a pod can communicate using inter process communication. In general though, pods are not durable entities and will not survive failures.

Within the context of Kubernetes, the term "service" may be used to have a very specific definition when describing work units. A service, when described this way, is a unit that acts as a basic load balancer and ambassador for other containers. A service groups together logical collections of pods that perform the same function to present them as a single entity. This allows a user to deploy a service unit that is aware of all of the backend containers to pass traffic to. External applications only need to worry about a single access point, but benefit from a scalable backend or at least a backend that can be swapped out when necessary. A service's IP address remains stable, abstracting any changes to the pod IP addresses that can happen as nodes die or pods are rescheduled. Services are an interface to a group of containers so that consumers do not have to worry about anything beyond a single access location. By deploying a service, a user easily gain discover-ability and can simplify container designs.

With respect to data replication, a more complex version of a pod is a replicated pod. These are handled by a type of work unit known as a replication controller. A replication controller is a framework for defining pods that are meant to be horizontally scaled. The work unit is, in essence, a nested unit. A template is provided, which is basically a complete pod definition. This is wrapped with additional details about the replication work that should be done. The replication controller is delegated responsibility over maintaining a desired number of copies. This means that if a container temporarily goes down, the replication controller might start up another container. If the first container comes back online, the controller will kill off one of the containers.

Replica controllers are generally responsible for watching objects state and trying to bring it to the desired state, and work with a ReplicaSet and Deployment objects. A ReplicaSet owns and manages pods and ensures that a specified number of pod "replicas" are running at any given time. A ReplicaSet can be auto-scaled by an Horizontal Pod Autoscalers (HPA). It is mainly used by Deployments as a mechanism to orchestrate pods. A Deployment owns and manages ReplicaSets, provides declarative updates for Pods and ReplicaSets, supports rolling updates, and supports rollbacks.

A Kubernetes organizational concept outside of the work-based units is labeling. A label is basically an arbitrary tag that can be placed on the above work units to mark them as a part of a group. These can then be selected for management purposes and action targeting. Labels are fundamental to the function of both services and replication controllers. To get a list of backend servers that a service should pass traffic to, it usually selects containers based on label.

Similarly, replication controllers give all of the containers spawned from their templates the same label. This makes it easy for the controller to monitor each instance. The controller or the administrator can manage all of the instances as a group, regardless of how many containers have been spawned.

Labels are given as key-value pairs. Each unit can have more than one label, but each unit can only have one entry for each key. Pods can be given a "name" key as a general purpose identifier, or they can be classified by various criteria such as development stage, public accessibility, application version, etc. In many cases, many labels can be assigned for fine-grained control. A user can then select based on a single or combined label requirements.

Persistent Volumes

With respect to Kubernetes Storage, on-disk files in a container are ephemeral. To provide data persistency, Kubernetes uses the "Volume" Concept, where a volume is a directory that is mounted to the container at a specific path. The lifetime and other characteristic depends on the storage type backing it. To become a storage provider one needs to implement a "volume plugin" (Kubernetes volume API). The volume is persistent between container failovers but may or may not be erased after a pod removal. It also enables file sharing between containers. Any practical storage type may be used including: emptyDir, hostPath, gcePersistentDisk, awsElasticBlockStore, NFS, iSCSI, Fibre Channel, flocker, glusterfs, RBD, cephfs, gitRepo, secret, persistentVolumeClaim, downwardAPI, projected, azureFileVolume, azureDisk, vsphereVolume, Quobyte, PortworxVolume, ScaleIO, StorageOS, and local storage.

In general, managing storage can be a distinct problem. The PersistentVolume subsystem provides an API for users and administrators that abstracts details of how storage is provided from how it is consumed. In an embodiment two new API resources are provided: PersistentVolume and PersistentVolumeClaim.

A PersistentVolume (PV) is a piece of storage in the cluster that has been provisioned by an administrator. It is a resource in the cluster just like a node is a cluster resource. PVs are volume plugins like volumes, but have a lifecycle independent of any individual pod that uses the PV. This API object captures the details of the implementation of the storage, be that NFS, iSCSI, or a cloud-provider-specific storage system.

A PersistentVolumeClaim (PVC) is a request for storage by a user. It is similar to a pod. Pods consume node resources and PVCs consume PV resources. Pods can request specific levels of resources (CPU and Memory). Claims can request specific size and access modes (e.g., can be mounted once read/write or many times read-only). While PersistentVolumeClaims allow a user to consume abstract storage resources, it is common that users need PersistentVolumes with varying properties, such as performance, for different problems. Cluster administrators need to be able to offer a variety of PersistentVolumes that differ in more ways than just size and access modes, without exposing users to the details of how those volumes are implemented. For these needs there is the StorageClass resource.

PersistentVolumes (PV) thus abstracts the storage management. With PersistentVolume, storage is provisioned by the admin with independent lifecycle of any pod. A PersistentVolumeClaim (PVC) is a request for storage by a user, PVC consumes PV, and can request specific size and access modes. A StorageClass acts as a profile/description of the storage determined by the administrator to be dynamically consumed Provisioning of storage can be static or dynamic. In the static case, the admin allocated a storage and created a specific PV with the details to be consumed. In the dynamic case, if none of the static PV matches the claim the cluster can allocate a storage dynamically according to the user defined storage class.

With respect to binding, a bound condition is when the controller finds a PV to match the PVC the PV is bound to the PVC exclusively. In an unbound condition, if no match was found the PVC will stay unbound until a matched PV be added to the cluster. The user uses the PVC as a volume, and the cluster will search for the bounded PV and mount it to the pod. The volume considered released only when the PVC has been deleted. For reclaiming, the system can define a policy for PV reusing once released. A retain process allows for manual reclamation of the resource, and a delete process deletes the PV and the actual storage allocated for it. For recycling, in most cases the volume content will be deleted (rm-rf/volume/*) but can be replaced by a custom recycler.

Network Block Device and Continuous Replication

On some operating systems, a network block device is a device node whose content is provided by a remote machine. Typically, network block devices are used to access a storage device that does not physically reside in the local machine but on a remote machine. As an example, a local machine can access a hard disk drive that is attached to another computer. Technically, a network block device is realized by three components: the server part, the client part, and the network between them. On the client machine, on which is the device node, a kernel driver controls the device. Whenever a program tries to access the device, the kernel driver forwards the request to the server machine, on which the data resides physically. If the client part is not fully implemented in the kernel it can be done with help of a user space program. On the server machine, requests from the client are handled by a user space program.

Network block device servers are typically implemented as a user space program running on a general-purpose computer. All of the functions specific to network block device servers can reside in a user space process because the process communicates with the client via conventional sockets and accesses the storage via a conventional file system interface. The network block device client module is available on some Unix-like operating systems, including Linux and Bitrig, among others. Since the server is a user space program, it can potentially run on any Unix-like platform.

In order to create a continuous replication for Kubernetes there is a need to be able to intercept the I/O (input/outputs) arriving to persistent volumes connected to pods. Traditional ways to implement include using a filter driver in the host kernel, or putting a splitter in the storage array. Thus, while it may be possible to replicate volume using kernel filter drivers, or leverage a splitter in a storage array, both replication techniques are limited. The array based replication technique requires specific array and is not heterogeneous, and the kernel splitter depends on the OS and requires access to the kernel.

To overcome these disadvantages, the NBD-based continuous replication process 110 allows configuration of a volume as a replicated volume by adding a new type of volume called an "NBD replicated volume," which includes a secondary type of the actual back-end volume type. The replication system automatically configures a pod with an NBD container running in it (the container can also run at the same pod as the application being replicated). The container will have an actual back-end device attached to it, for example the NBD container may have a persistent volume on the ScaleIO (or any software-defined storage) attached to it. ScaleIO is a software-defined storage system that creates a server-based SAN (storage area network) from local application server storage using certain servers or hardware. It is also used to convert DAS (direct-attached storage) into shared block storage.

The NBD container runs a modified version of an NBD server (which is a user space code), and exposes a volume over the NBD. The server intercepts all the I/Os arriving to the NBD volume, so a filter driver can be used to run within the NBD server. The filter driver intercepts the writes to the NBD volume and in turn writes them to the actual persistent volume. The intercepted I/Os will also be sent to a remote replication server container which will have a remote persistent volume attached to it, and also to a journal volume. The data will be applied to the replication volume using the journal as in a RecoverPoint, or similar system, to allow recovery for any point in time. The journal or journal volume comprises a data log or similar database structure storing time-ordered data entries in a storage medium.

Figure 3:
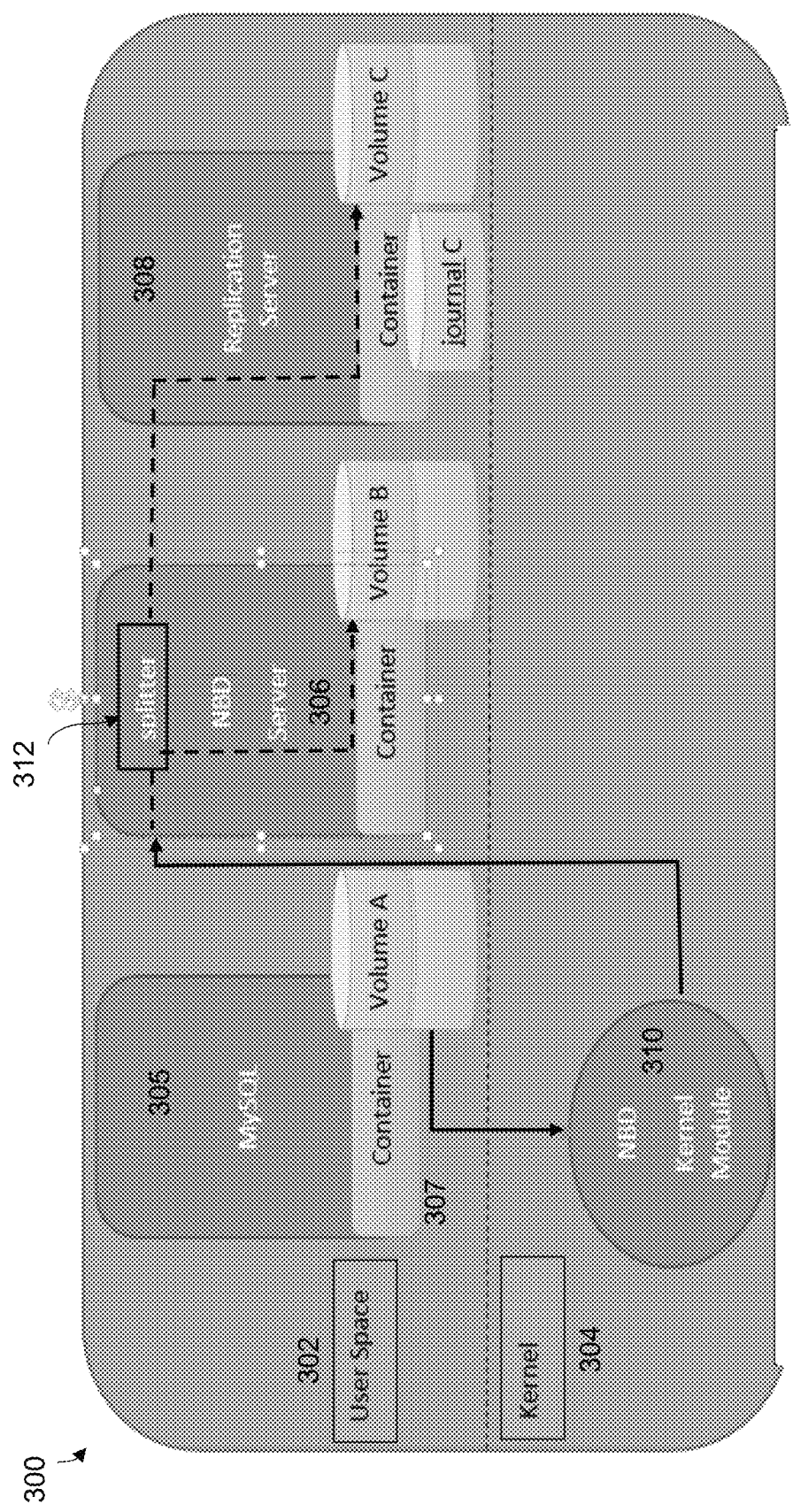
FIG. 3 illustrates an NBD filter replication system under some embodiments.

FIG. 3 illustrates an NBD filter replication system under some embodiments. System 300 show certain user space 302 components and kernel 304 components and represents an NBD filter based replication system for a SQL server 305. The example embodiment of system 300 replicates a MySQL 307 container that is configured to be connected to an NBD volume 310 in the kernel 304. The NBD volume 310 is exposed by an NBD server 306 container, which is attached to a persistent volume B (on ScaleIO, for example). The NBD splitter 312 replicates the I/O to a replication server 308, which is a special container attached to two persistent volumes: a journal C and a replica volume C. The replication server 308 applies continuous replication technology using the volume (volume C) and the journal (journal C). In FIG. 3, Volume A represents a container mapped volume, which is the volume that is mapped upon the NBD client block device. Volume B represents the production volume to write the client I/Os. Volume C is a replica volume accessible from the replication server, and journal C is the replica journal.

Figure 4:
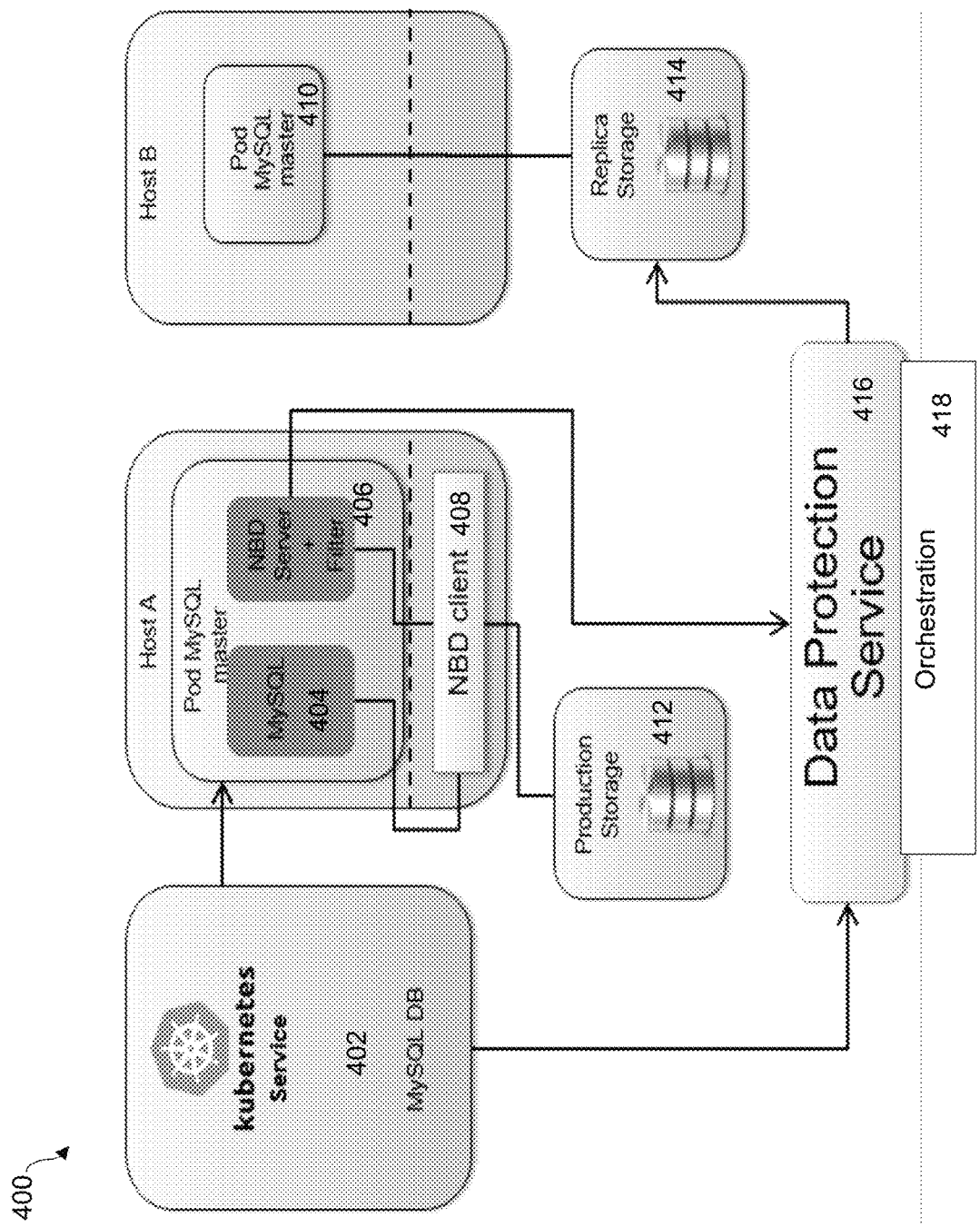
FIG. 4 is a system-level block diagram of a Kubernetes continuous replication system under some embodiments.

FIG. 4 is a system-level block diagram of a Kubernetes continuous replication system under some embodiments. System 400 includes a Kubernetes server 402 running a MySQL database which has data backed up by data protection service 416 for storage on storage media 414. The continuous replication process maps the block device in to a container running an NBD server with filter 406 and exposes the production storage disk 412. It uses the NBD client 408 on the Host A to connect the exposed disk and create a local block device (such as /dev/nbd0). The process intercepts the I/Os on the NBD server 406 and replicates them to the remote Host B side. To perform a test or failover operation, the process mounts the replica file as a block device and connects to the replica container. FIG. 4 represents any Kubernetes cluster with any volume plugin that creates a block device on the host.

FIG. 4 illustrates the replication system including the data protection service 416 and orchestration component 418, which allows selecting pods for replication and automatically changing the pod manifest files to consume NBD based volumes instead of the original volumes. The data protection service 416 automatically runs NBD servers 406 and attaches them to the back-end persistent volumes of selected pods, such as pod 410. The data protection service 416 is also in charge of the reconfiguration during failover.

For failover, with reference to FIGS. 3 and 4, the orchestration system 418 orchestrates the failover of a pod by shutting down the containers running in the pod and selecting a point in time on the replication server to allow the replication server 308 to roll the data to the required point in time. The failover process also involves configuring an NBD server 306 and connecting it to the volume C, exposing an NBD volume, and reconfiguring the original pod to attach to the new NBD filter and starting the running of the pod.

Figure 5:
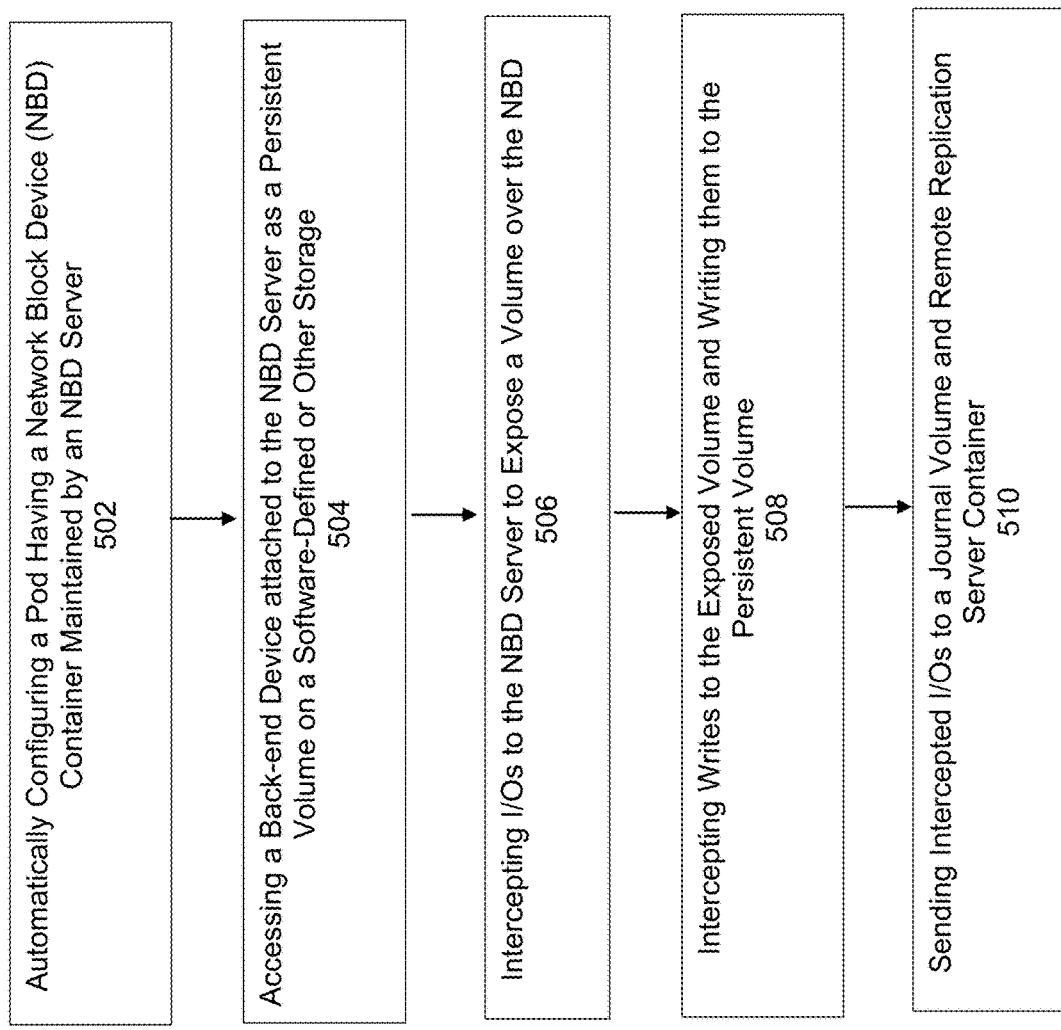
FIG. 5 is a flowchart illustrating a method of performing continuous replication in a Kubernetes container management system, under some embodiments.

FIG. 5 is a flowchart illustrating a method of performing continuous replication in a Kubernetes container management system, under some embodiments. The process of FIG. 5 starts by automatically configuring a pod having a NBD container maintained by an NBD server, 502. It accesses a back-end device that is attached to the NBD server as a persistent volume on a software-defined storage or any other storage, 504. Next, the process intercepts input/output (I/O) communication to the NBD server to expose a volume over the NBD 506, and intercepts writes to the exposed volume and writes them to the persistent volume 508. The intercepted I/Os are sent to a journal volume and a remote replication server container to which the persistent volume is attached, 510.

Figure 6:
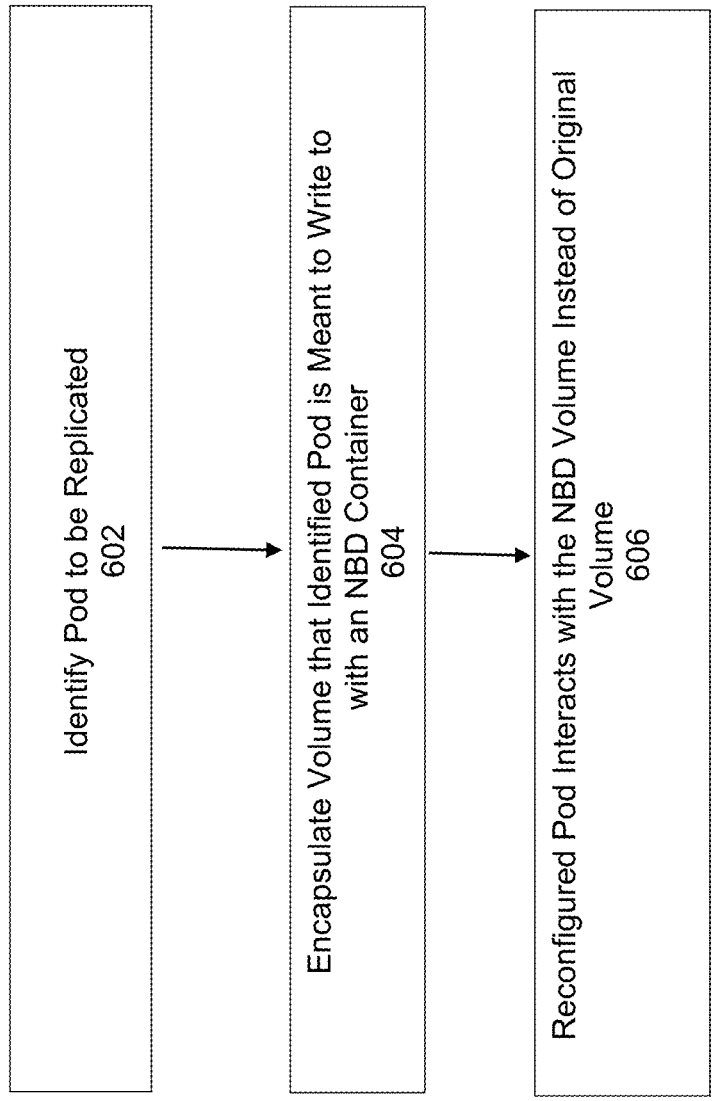
FIG. 6 is a flowchart that illustrates a method of reconfiguring a pod to use the NBD volume instead of the original volume to thus allow replication, under some embodiments.

As part of the overall process, a pod to be replicated is reconfigured to use the NBD volume instead of an original volume. FIG. 6 is a flowchart that illustrates a method of reconfiguring a pod to use the NBD volume instead of the original volume to thus allow replication, under some embodiments. As shown in FIG. 6, a configured pod that is intended to be replicated is identified, 602. The volume that the pod is supposed to write to is encapsulated with an NBD container, 604. The reconfigured pod then interacts with the NDB volume instead the original volume, 606.

Embodiments of the continuous replication method leverages NBD technology to create an agnostic filter driver, along with an orchestration engine that allows a data protection service to add replication seamlessly. The replication can also be added in a brown-filed environments, but the pods will need a restart. The NBD server will consume the original volumes so there will be no data loss. The system is very scalable as each pod replication is separate.

Embodiments of the continuous replication process 110 can be used to implement efficient and effective backups, which are the core of the data protection and disaster recovery practices for enterprises. Data protection (DP) enables recovery of data on the production site from an operational error, copies are from multiple point in time. The replica copy can be on the same site for this purpose. Disaster recovery (DR) provides a full data recovery solution for a cases where there is a full production site disaster. For this reason a DR must have a replica copy on a remote site. The copy can be latest point in time but DR may also support operational recovery from multiple point in time.

As stated above, embodiments may be used in conjunction with VMware RecoverPoint to perform any point-in-time (PiT) replication to create multiple application consistent point-in-time snapshots. In general, RecoverPoint for virtual machines uses a journal-based implementation to hold the PiT information of all changes made to the protected data. It provides the shortest recovery time to the latest PiT via journal technology enables recovery to just seconds or fractions of a second before data corruption occurred. RecoverPoint for VMs is a fully virtualized hypervisor-based replication and automated disaster recovery solution. Depending on system configuration; flexible deployment configurations and hypervisor splitters may reside on all servers with protected workloads, allowing replication and recovery at the virtual disk (VMDK and RDM) granularity level. The I/O splitter resides within the hypervisor so that RecoverPoint for VMs can replicate VMs to and from any storage array supported by the system, such as SAN, NAS, DAS, and vSAN. Although embodiments are described with respect to RecoverPoint for PiT snapshot implementation, any other similar program or product may be used.

Figure 7:
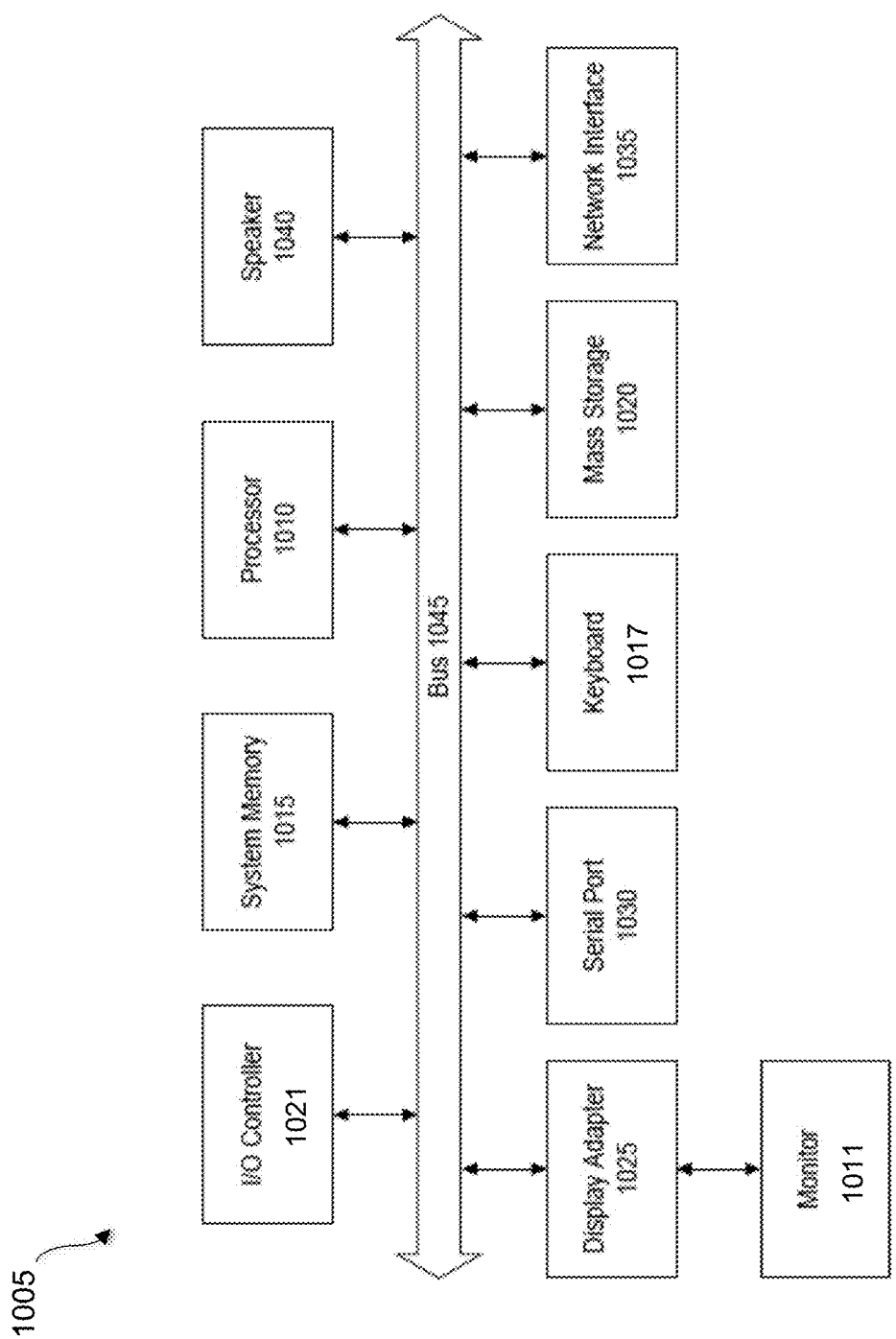
FIG. 7 shows a system block diagram of a computer system used to execute one or more software components of the present system described herein.

The network of FIG. 1 may comprise any number of individual client-server networks including virtual machines coupled over the Internet or similar large-scale network or portion thereof. Each processing device in the network or container system may comprise a computing device capable of executing software code to perform the processing steps described herein. FIG. 7 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 7 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of providing continuous replication for a container management system, comprising:

automatically configuring a pod having a network block device (NBD) container maintained by an NBD server;

accessing a back-end device attached to the NBD server as a persistent volume on a software-defined storage;

intercepting input/output (I/O) communication to the NBD server to expose a volume over the NBD;

intercepting, in a filter driver running within the NBD server, writes to the exposed volume and writing them to the persistent volume;

sending the intercepted I/O communication to a journal and a remote replication server container which has the persistent volume attached thereto;

identifying a pod to be replicated in a failover operation; and applying data of the I/O communication to the replication volume server container using the journal to allow recovery for any point in time for the failover operation.

2. The method of claim 1 further comprising encapsulating a volume that the pod with the NBD container so that the pod can interact with an NBD volume of the NBD container.

3. The method of claim 2 further comprising performing the failover operation by:

shutting down all containers running in the pod;

selecting a point-in-time on the replication server;

causing the replication server to roll the data to the selected point in time;

configuring the NBD server and connecting it to a replica volume accessible from the replication server to expose the NBD volume; and reconfiguring the pod to attach to a new NBD filter prior to restart of the pod.

4. The method of claim 3 further comprising adding, through an orchestration engine, a replication of the replication process seamlessly using the NBD filter.

5. The method of claim 1 wherein the software-defined storage comprises a DellEMC® ScaleIO™ software-defined storage system that creates a server-based storage area network (SAN) from local application server storage using certain servers or hardware.

6. The method of claim 1 wherein the NBD server includes a splitter component splitting the intercepted I/Os to the NBD container and to a remote replication server container.

7. The method of claim 1 wherein the journal comprises a data log stored on a storage medium accessible to the replication server.

8. The method of claim 1 wherein the container management system comprises a Kubernetes system, and wherein the persistent volume is implemented as a Kubernetes PersistentVolume (PV) in a cluster.

9. A computer-implemented method of providing continuous replication for container management system, comprising:

intercepting, in a network block device (NBD) server input/output (I/O) communications from a containerized application having an application volume;

sending the intercepted I/Os to an NBD container on the NBD server, a replica container, and a journal container on a replication server functionally coupled to the NBD server;

exposing an NBD volume on the NBD container to a persistent volume of the NBD server; and applying, by the replication server, continuous replication using the replica container and the journal container to replicate the application volume.

10. The method of claim 9 wherein the container management system comprises a Kubernetes system, and wherein the replica container and journal container are implemented as Kubernetes PersistentVolumes (PVs).

11. The method of claim 10 wherein the application volume represents a container mapped volume in user space that is mapped upon the NBD client block device in kernel space.

12. The method of claim 11 further comprising:

identifying a to be replicated; and encapsulating a volume that the pod is meant to write to with the NBD container so that the identified pod can interact with an NBD volume of the NBD container.

13. The system of claim 12 wherein the journal comprises a data log stored on a storage medium accessible to the replication server.

14. The method of claim 9 wherein the persistent volume of the NBD server is maintained in a software-defined storage system.

15. The method of claim 14 wherein the software-defined storage system comprises a DellEMC® ScaleIO™ software-defined storage system that creates a server-based storage area network (SAN) from local application server storage using certain servers or hardware.

16. A system comprising a processor-based executable module configured to provide continuous replication for container management system, comprising:

a network block device (NBD) of an NBD server having a filter driver intercepting input/output (I/O) communications from a containerized application having an application volume;

a splitter of the NBD server sending the intercepted I/Os to an NBD container on the NBD server, a replica container, and a journal container on a replication server functionally coupled to the NBD server, exposing an NBD volume on the NBD container to a persistent volume of the NBD server; and a replication process executed on the replication server applying continuous replication using the replica container and the journal container to replicate the application volume.

17. The system of claim 16 wherein the container management system comprises a Kubernetes system, and wherein the replica container and journal container are implemented as Kubernetes PersistentVolumes (PVs).

18. The system of claim 17 further comprising an orchestration engine allowing a data protection service to add replication seamlessly using the NBD filter driver.

19. The system of claim 16 wherein the replication process further:

identifies a pod that is to be replicated is identified; and encapsulates a volume that the pod writes to with the NBD container so that the identified pod can interact with an NBD volume of the NBD container.

20. The system of claim 19 wherein the persistent volume of the NBD server is maintained in a software-defined storage system, and wherein the software-defined storage system comprises a DellEMC® ScaleIO™ software-defined storage system that creates a server-based storage area network (SAN) from local application server storage using certain servers or hardware.

* * * * *